Patented May 6, 1952

2,596,047

UNITED STATES PATENT OFFICE 2,596,047

URANIUM-AROYL ALDEHYDE COMPLEXES AND METHOD OF MAKING SAME

Hermann I. Schlesinger, Chicago, Ill., and Herbert C. Brown, Detroit, Mich., assignors to the United States of America as represented by the United States Atomic Energy Commission No Drawing. Application October 23, 1945, Serial No. 624,094

7 Claims. (Cl. 260—429)

This invention relates to new and useful uranium complexes and to the recovery of uranium by formation of such complexes. Specifically the invention is concerned with the complexes of uranium with aroylaldehydes which contain ketone groups separated by a methylene group. Of particular interest are the complexes wherein carbonyl groups are linked by a single carbon atom.

Graphically complexes of this type formed from hexavalent uranium as uranyl ion $UO_2^{+2}$ and tetravalent uranium as $U^{+4}$ may be represented by the following general structures:

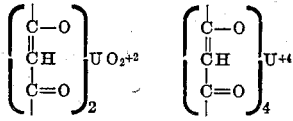

wherein one of the free bonds attached to carbon is linked to an aroyl group and the other is linked to hydrogen. In such compounds the $UO_2^{+2}$ or $U^{+4}$ is apparently linked by a covalent bond to the enolic group of the aroylaldehyde and also by a coordinate bond to the aldehyde group.

In accordance with the present invention it has been found that complexes of the above described class may be prepared by reacting aqueous solutions of uranium in a tetra- or hexavalent state with an aroyl aldehyde. Uranous tetra aroyl complexes are preferably prepared by reacting aqueous solutions of uranium, e. g., uranous chloride and an alkali metal derivative of an aroyl aldehyde, e. g., sodium benzoyl acetaldehyde. The uranous tetra aroyl complex will be observed to precipitate from the reaction mixture usually in the form of a brown precipitate. The uranyl diaroyl complexes may be obtained by addition of a soluble uranyl salt, e. g., uranyl nitrate or other salt capable of supplying uranium ions including tetravalent uranium ion or uranyl ion to sodium benzoyl acetaldehyde, both reactants being in methanol solution. Upon completion of the reaction the methanol is removed, leaving the desired product in the form of a red residue. The precipitates obtained may be separated by filtration or other convenient means and washed with water or methanol and dried over a suitable drying agent.

In carrying out our invention uranium is recovered from solutions thereof by contacting the same with an aroyl adlehyde such as, for example, sodium benzoyl acetaldehyde, to form a water insoluble complex such as herein described. These complexes are then precipitated from solution or extracted with a solvent.

Suitable solvents include chloroform, benzene, ethyl acetate, carbon tetrachloride, aniline, n-hexylalcohol, xylene, and ethyl ether. The water immiscible organic solvents used in the process of the present invention extract the uranium organic complexes from aqueous solutions either by actual solution in the solvent or by preferential wetting of the solvent. In the case of preferential wetting, the uranium complex may appear in the organic solvent as a suspension or precipitate.

It may be found desirable for further purification to dissolve the resulting precipitates in alcohol and reprecipitate by the addition of water. Repeated washing with water may then be employed to secure a pure material.

The compounds or complexes herein described are stable colored compositions probably of the chelate type. They are generally organic solvent-soluble solids. The compounds of tetravalent uranium produced as herein contemplated are quite volatile as compared with other uranium compounds. As a result of their general insolubility in water, such compounds are useful in separating uranium from its aqueous media which may contain associated impurities. Many of these compositions may be used as dyes or pigments due to their high color.

The present invention is illustrated by the following examples:

Example I

A methanol solution of 3.8 grams of sodium benzoyl acetaldehyde was added to a methanol solution of 5.0 grams of uranyl nitrate at room temperature. The methanol was removed, leaving a red residue which turned orange when slightly warmed. The material was then triturated with water, filtered, and dried. The compound was purified by dissolving in methanol, removing the suspended material and evaporating the solvent. The complex uranyl dibenzoyl acetaldehyde, $UO_2(C_6H_5COCHCHO)_2$, melted at 140–145° C. Analysis for $C_{18}H_{14}O_6U$ : U; calc'd, 42.41 per cent. Found, 43.51 per cent.

Example II 6.8 grams of sodium benzoyl acetaldehyde was dissolved in water, heated with three drops of acetic acid and then treated with an aqueous solution of 3.8 grams of uranous chloride. A brown precipitate formed immediately. It was filtered and dried in a vacuum desiccator for forty-eight hours. From a benzene solution of the product, a brown tar was precipitated. The solution was filtered from this tar and heated with ligroin and an amorphous compound, uranous tetra benzoyl acetaldehyde, U(C₆H₅COCHCHO)₄, melting at 130–133° C. precipitated. Analysis for $$C_{36}H_{28}O_8U:U$$

calc'd, 28.82 per cent. Found, 28.71 per cent.

Although the present invention has been described with reference to specific details with certain embodiments thereof, it is not intended that such details shall be regarded as limitations except in so far as included in the accompanying claims.

What is claimed is:

1. As a new composition of matter, a complex of uranium with benzollacetaldehyde.
2. Uranyl dibenzoylacetaldehyde.
3. Uranous tetra benzoylacetaldehyde.
4. In a process for the synthesis of chelate compounds of uranium and benzoylacetaldehyde the step which comprises reacting a solution of a uranium salt with a solution of an alkali metal derivative of benzoylacetaldehyde.
5. The process of claim 4 in which the uranium solution and the aldehyde solution are aqueous solutions.
6. A method which comprises removing uranium from an aqueous solution comprising uranium and impurities associated therewith by forming a complex of the hexavalent uranium and benzoylacetaldehyde and thereafter removing the complex.
7. The process of claim 4 in which the uranium solution and the aldehyde solution are methanol solutions.

HERMANN I. SCHLESINGER.
HERBERT C. BROWN.

REFERENCES CITED

The following references are of record in the file of this patent:

UNITED STATES PATENTS

| Number | Name | Date |
| --- | --- | --- |
| 2,156,918 | Lyons | May 2, 1939 |
| 2,161,184 | McKone et al. | June 6, 1939 |
| 2,197,498 | Guthmann | Apr. 16, 1940 |

FOREIGN PATENTS

| Number | Country | Date |
| --- | --- | --- |
| 289,493 | Great Britain | Apr. 30, 1928 |

OTHER REFERENCES

Claisen et al.: Ber. vol. 20, pages 2191–93.

Biltz et al.: Notizen uber Acetyl-acetonate, Zeitschrift fur Anorganische Chemie, vol. 40, pp. 218–224 (1904).

Berichte Deu. Chem. vol. 21, page 1136, Claisen.